(12) United States Patent
Takeuchi et al.

(10) Patent No.: US 8,228,663 B2
(45) Date of Patent: Jul. 24, 2012

(54) LAMINATED CERAMIC ELECTRONIC COMPONENT

(75) Inventors: Shunsuke Takeuchi, Echizen (JP); Kenichi Kawasaki, Echizen (JP); Akihiro Motoki, Fukui (JP); Makoto Ogawa, Fukui (JP); Toshiyuki Iwanaga, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 264 days.

(21) Appl. No.: 12/616,844

(22) Filed: Nov. 12, 2009

(65) Prior Publication Data
US 2010/0118467 A1 May 13, 2010

(30) Foreign Application Priority Data
Nov. 13, 2008 (JP) .................. 2008-290702

(51) Int. Cl.
*H01G 4/228* (2006.01)
*H01G 4/06* (2006.01)

(52) U.S. Cl. ............... 361/306.3; 361/321.1; 361/321.2; 361/321.3; 361/321.4

(58) Field of Classification Search ........... 361/320, 361/321.2, 321.4, 306.3, 321.3, 321.1
See application file for complete search history.

(56) References Cited

U.S. PATENT DOCUMENTS

| | | | |
|---|---|---|---|
| 6,725,525 B1 | 4/2004 | Shikama et al. | |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,933,113 B2 * | 4/2011 | Motoki et al. | 361/309 |
| 2004/0042155 A1 * | 3/2004 | Ritter et al. | 361/309 |
| 2005/0046536 A1 | 3/2005 | Ritter et al. | |
| 2007/0014075 A1 * | 1/2007 | Ritter et al. | 361/306.3 |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

GB 2 400 493 A 10/2004
(Continued)

OTHER PUBLICATIONS

Motoki et al.; "Multilayer Electronic Component and Method for Manufacturing Multilayer Electronic Component"; U.S. Appl. No. 12/055,372, filed Mar. 26, 2008.

(Continued)

*Primary Examiner* — Eric Thomas
*Assistant Examiner* — Arun Ramaswamy
(74) *Attorney, Agent, or Firm* — Keating & Bennett, LLP

(57) ABSTRACT

In a laminated ceramic electronic component, external terminal electrodes include plating films directly covering exposed portions of internal electrodes on end surfaces of a ceramic element assembly. On the boundaries between the end surfaces and principal surfaces of the ceramic element assembly, substantially rounded corners are provided, and the plating films are arranged such that the ends of the plating films stop at the corners and do not project from the principal surfaces.

3 Claims, 8 Drawing Sheets

FOREIGN PATENT DOCUMENTS

| | | |
|---|---|---|
| JP | 57-050417 A | 3/1982 |
| JP | 63-146421 A | 6/1988 |
| JP | 63-169014 A | 7/1988 |
| JP | 9-50901 A | 2/1997 |
| JP | 11-67554 A | 3/1999 |
| JP | 2001-35746 A | 2/2001 |
| JP | 2001-52937 A | 2/2001 |
| JP | 2001-237078 A | 8/2001 |
| JP | 2004-327983 A | 11/2004 |
| JP | 2006-237078 A | 9/2006 |
| JP | 2006-332601 A | 12/2006 |
| JP | 2007-208112 A | 8/2007 |

OTHER PUBLICATIONS

Motoki et al.; "Multilayer Electronic Component and Method for Manufacturing the Same"; U.S. Appl. No. 12/142,924, filed Jun. 20, 2008.

* cited by examiner

LAMINATED CERAMIC ELECTRONIC COMPONENT

BACKGROUND OF THE INVENTION

1. Field of the Invention

The present invention relates to laminated ceramic electronic components, and particularly relates to the structure of external terminal electrodes to be provided on the laminated ceramic electronic components.

2. Description of the Related Art

In recent years, the market for compact portable electronic devices, such as cellular phones, notebook personal computers, digital cameras, and digital audio devices, has expanded. In the portable electronic devices, the size has been increasingly reduced and, simultaneously, the performance has been increasingly improved. A large number of laminated ceramic electronic components are mounted on portable electronic devices. There have demands on the laminated ceramic electronic components to reduce the size and improve the performance thereof. For example, it has been demanded of laminated ceramic capacitors to reduce the size and increase the capacitance.

As a measure for reducing the size and increasing the capacitance of laminated ceramic capacitors, it is effective to reduce the thickness of a ceramic layer to form a thin ceramic layer. Recently, ceramic layers having a thickness of about 3 μm have been put into practical use. At present, research is being conducted to find a way to further reduce the thickness of the layers of the multilayer capacitor. However, as the thickness of the ceramic layer has been increasingly reduced, short circuiting between internal electrodes is likely to occur, causing a problem in that it is difficult to secure the quality.

As another measure, a measure for increasing the effective area of the internal electrodes is mentioned. However, when laminated ceramic capacitors are mass-produced, it is necessary to secure the side margin between the internal electrodes and the side surfaces of a ceramic element assembly or the end margin between the internal electrodes and the end surfaces of the ceramic element assembly to some extent in consideration of lamination shift and cut shifting of a ceramic green sheet. Therefore, there is a limitation on increasing the effective area of the internal electrodes.

In order to increase the effective area of the internal electrodes while securing a given margin, it is necessary to increase the area of a ceramic layer. However, there is a limitation on increasing the area of the ceramic layer within a determined standard dimension and, moreover, the thickness of the external terminal electrode itself also serves as a hindrance.

Heretofore, the external terminal electrodes of the laminated ceramic capacitor are formed by applying and printing a conductive paste to the ends of the ceramic element assembly. As methods for applying a conductive paste, a method for immersing the ends of the ceramic element assembly in a paste tub containing a conductive paste, and then pulling up the same is used in most cases. However, according to the method, the conductive paste is likely to thickly adhere to the center of the end surfaces of the ceramic element assembly due to the viscosity of the conductive paste. Thus, the external terminal electrodes are partially thickened (specifically, exceeds 30 μm, for example), and thus the area of the ceramic layer is caused to decrease.

In view of the above, a method for directly forming external terminal electrodes by plating has been proposed (e.g., Japanese Unexamined Patent Application Publication No. 2004-327983). According to the method, when a plating film precipitates and grows on exposed portions of the internal electrodes on the end surfaces of the ceramic element assembly as the nucleus, exposed portions of adjacent internal electrodes are connected to each other. Therefore, the application of the method allows the formation of thin and flat external terminal electrodes compared with those obtained by former methods using a conductive paste.

Preferred embodiments disclosed in Japanese Unexamined Patent Application Publication No. 2004-327983 are classified into a first typical example (FIG. 7B in Japanese Unexamined Patent Application Publication No. 2004-327983) in which the plating films are formed while being limited to the end surfaces of a ceramic element assembly and a second typical example (FIGS. 8B and 10B in Japanese Unexamined Patent Application Publication No. 2004-327983) in which the plating films are formed so as to extend up to one portion of each of a pair of adjacent principal surfaces from the end surfaces of the ceramic element assembly. In the first typical example, an exposed conductive area serving as the nucleus for growing the plating films is not formed on a portion other than the exposed portions of the internal electrodes on the end surfaces of the ceramic element assembly. In the second typical example, an exposed conductive area serving as the nucleus for growing the plating film is formed also on, for example, a portion other than the exposed portions of the internal electrodes on the end surfaces of the ceramic element assembly.

However, the first typical example and the second typical example have problems to be solved.

First, in the first typical example, the distance from the ends of the plating films to the exposed portions of the internal electrodes is relatively short. Thus, a penetration path of moisture or the like from the outside to the inside of the ceramic element assembly through the internal electrodes becomes short, and thus sufficient humidity resistance reliability cannot be obtained in some cases.

In contrast, in the second typical example, the plating film is formed while projecting from the principal surface of the ceramic element assembly, causing a problem of impeding the reduction in the thickness of laminated ceramic electronic components.

SUMMARY OF THE INVENTION

Accordingly, preferred embodiments of the present invention provide a laminated ceramic electronic component having external terminal electrodes capable of solving the above-described problems.

According to a preferred embodiment of the present invention, a laminated ceramic electronic component includes a ceramic element assembly including a laminate of a plurality of ceramic layers in which a pair of principal surfaces face each other, a pair of side surfaces face each other, and a pair of end surfaces face each other; internal conductors disposed in the ceramic element assembly and having exposed portions on each end surface of the ceramic element assembly; and external terminal electrodes each having a plating film directly covering the exposed portions of the internal conductors on the end surfaces of the ceramic element assembly. In order to solve the above-described technical problems, the laminated ceramic electronic component has the following structures.

First, substantially rounded corners are provided on the boundaries between the end surfaces and the principal surfaces of the ceramic element assembly. The above-described plating films are arranged such that the ends of the plating films stop at the corners and do not project from the principal surfaces in the lamination direction of the ceramic layer.

According to a preferred embodiment of the present invention, it is preferable for the external terminal electrodes to have auxiliary conductor films covering the ends of the plating films at the corners and, simultaneously, extending up to one portion of the principal surfaces. In this case, it is more preferable that the auxiliary conductor films contain a glass component and that the glass component partially penetrates in the interfaces of the plating films and the ceramic element assembly.

Moreover, the internal conductors may contain dummy internal conductors that do not substantially contribute to the development of electrical properties.

According to a preferred embodiment of the present invention, the substantially rounded corners are preferably arranged on the boundaries between the end surfaces and the principal surfaces of the ceramic element assembly and the plating films forming the external terminal electrodes are arranged so that the ends stop at the corners. Thus, the distance from the ends of the plating films to the exposed portions of the internal conductors on the end surfaces of the ceramic element assembly can be sufficiently increased. Therefore, the penetration path of moisture or the like reaching the inside of the ceramic element assembly from the outside through the internal conductors can be relatively increased. Thus, the humidity resistance reliability of the laminated ceramic electronic component can increase.

Moreover, according to a preferred embodiment of the present invention, the plating films are arranged so as not to project from the principal surfaces in the lamination direction of the ceramic layer. Thus, the reduction in the thickness of the laminated ceramic electronic component can be advantageously achieved.

According to a preferred embodiment of the present invention, when the external terminal electrodes are further provided with the auxiliary conductor films arranged so as to extend up to one portion of the principal surfaces, so that the auxiliary conductor films cover the ends of the plating films, the humidity resistance reliability described above can further increase. The ends of the plating films are arranged so as to stop at the corners as described above, and thus only the auxiliary conductor films are provided as the external terminal electrodes on the principal surfaces. Therefore, an increase in the dimension in the height direction of the laminated ceramic electronic component can be kept to a minimum.

According to a preferred embodiment of the present invention, when the auxiliary conductor films described above include a glass component and the glass component partially penetrates in the interfaces of the plating films and the ceramic element assembly, the humidity resistance reliability can further increase.

According to a preferred embodiment of the present invention, when the internal conductors include dummy internal conductors, the fixing force of the plating films to the ceramic element assembly can increase and, simultaneously, by selecting the formation position of the dummy internal conductors, the precipitation areas of the plating films can be easily controlled.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
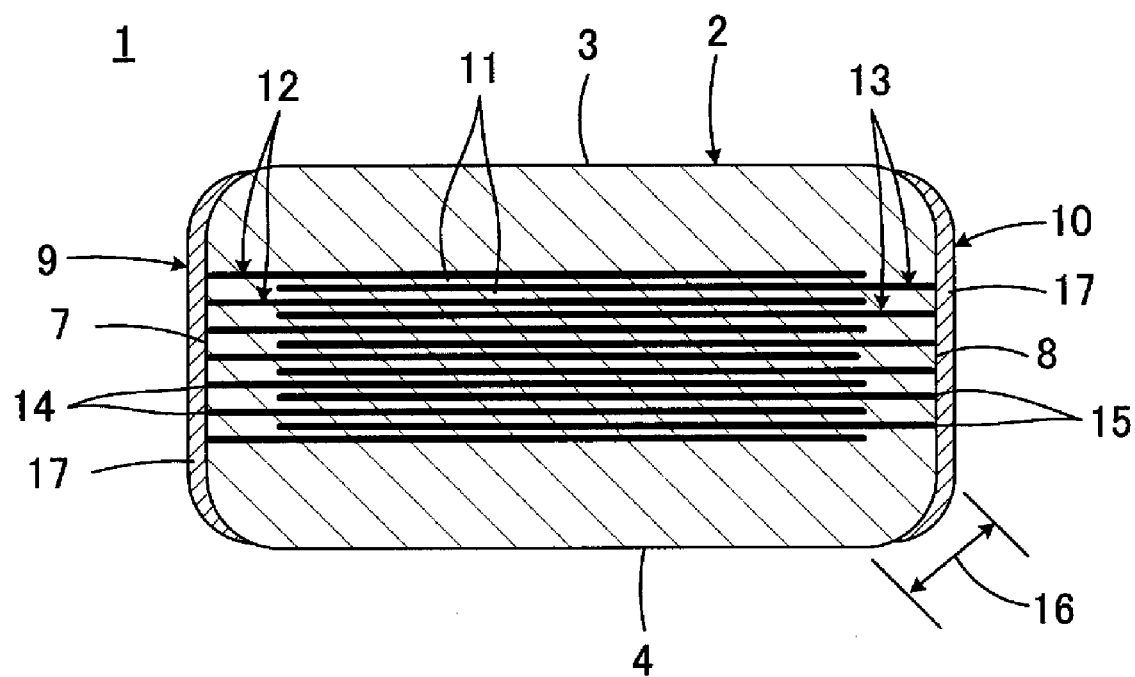
FIG. 1 is a cross-sectional view illustrating a laminated ceramic capacitor according to a first preferred embodiment of the present invention.
Figure 2:
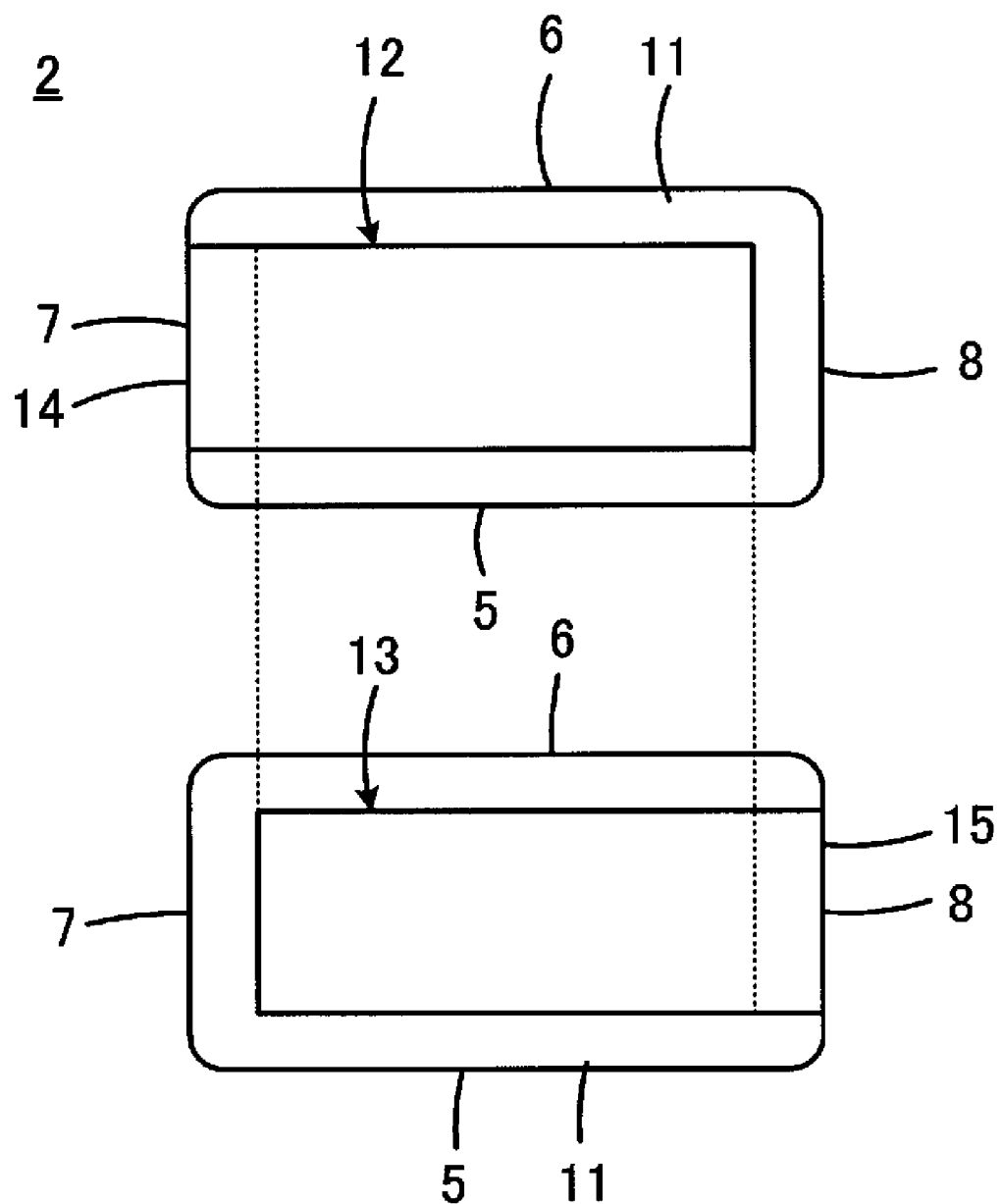
FIG. 2 is a plan view illustrating the internal structure of a ceramic element assembly to be disposed on the laminated ceramic capacitor illustrated in FIG. 1.

FIG. 1 is a cross-sectional view illustrating a laminated ceramic capacitor 1 as an example of a laminated ceramic electronic component according to a first preferred embodiment of the invention. The laminated ceramic capacitor 1 includes a ceramic element assembly 2. FIG. 2 is a plan view illustrating the internal structure of the ceramic element assembly 2.

Referring to FIGS. 1 and 2, the ceramic element assembly 2 preferably is a substantially rectangular parallelepiped shape having a pair of principal surfaces 3 and 4 facing each other, a pair of side surfaces 5 and 6 facing each other, and a pair of end surfaces 7 and 8 facing each other. On the first and second end surfaces 7 and 8 of the ceramic element assembly 2, first and second external terminal electrodes 9 and 10 are provided, respectively.

The ceramic element assembly 2 has a structure in which a plurality of ceramic layers 11 are laminated. In the ceramic element assembly 2, a plurality of pairs of first and second internal electrodes 12 and 13 as internal conductors are alternately arranged with a given ceramic layer 11 being interposed therebetween. The first internal electrodes 12 have exposed portions 14 on the first end surface 7 and the second internal electrodes 13 have exposed portions 15 on the second end surface 8. The exposed portions 14 of the first internal electrodes 12 are covered with the first external terminal electrode 9 to be electrically connected to the first external terminal electrode 9. The exposed portions 15 of the second internal electrodes 13 are covered with the second external terminal electrode 10 to be electrically connected to the second external terminal electrode 10.

Hereinafter, the unique structural features of the present preferred embodiment will be described.

As illustrated in FIG. 1, substantially rounded corners are arranged on the boundaries between each of the end surfaces 7 and 8 and each of the principal surfaces 3 and 4 of the ceramic element assembly 2. The substantially rounded corners 16 are formed preferably by polishing treatment by barrel polishing or other suitable process. By the polishing treatment described above, shaping of the exposed portions 14 and 15 of the internal electrodes 12 and 13 is simultaneously achieved.

As a result of the polishing treatment described above, the substantially rounded corners are also formed on the boundaries between each of the end surfaces 7 and 8 and each of the side surfaces 5 and 6 as illustrated in FIG. 2, which is not essential for the present invention.

The external terminal electrodes 9 and 10 each preferably have the plating film 17 directly covering the exposed portion 14 or 15 of the internal electrodes 12 or 13 on the end surfaces 7 and 8, respectively. In this preferred embodiment, each of the external terminal electrodes 9 and 10 is preferably formed only of the plating film 17. The plating films 17 are formed and arranged such that the ends stop at the corners 16 and do not project from the principal surfaces 3 and 4 in the lamination direction of the ceramic layer 11. It is preferable that the plating films 17 contain Cu and the thickness thereof be adjusted to about 10 µm, for example.

The ceramic layer 11 is preferably constituted by a dielectric ceramic containing, for example, $BaTiO_3$, $CaTiO_3$, $SrTiO_3$, $CaZrO_3$, or the like as a main component. Additional components, such as an Mn compound, an Fe compound, a Cr compound, a Co compound, or an Ni compound, may be added to the main components. The thickness of the ceramic layer 11 is preferably adjusted to, for example, about 1 µm to about 10 µm, after firing.

The size of the laminated ceramic capacitor 1, 0402 size, 0603 size, 1005 size, 1608 size, 2012 size, 3216 size, 3225 size (JEITA STANDARD), etc., may preferably be adopted. In particular, the present preferred embodiment of the present invention is useful for providing a thin film having a dimension in the height direction of about 0.3 mm or lower, or about ⅕ to about ⅔ times the dimension in the width direction (a dimension shorter than a dimension in the lengthwise direction) as the size of a laminated ceramic electronic component, such as the laminated ceramic capacitor 1.

As conductive components contained in the internal electrodes 12 and 13, Ni, Cu, Ag, Pd, an Ag—Pd alloy, Au, etc., can be used, for example. When the plating film 17 contains Cu, it is particularly preferable to use Ni as the conductive component contained in the internal electrodes 12 and 13, considering the reactivity with the Cu. The thickness of each of the internal electrodes 12 and 13 after firing is preferably about 0.5 µm to about 2.0 µm, for example.

Next, an example of a method for producing the laminated ceramic capacitor 1 described above will be described.

First, a ceramic green sheet to serve as the ceramic layer 11 and a conductive paste for the internal electrodes 12 and 13 are separately prepared. The ceramic green sheet and the conductive paste contain a binder and a solvent. As the binder and the solvent, known organic binders and organic solvents can be used, respectively.

Next, a conductive paste is printed on the ceramic green sheet to form a given pattern by, for example, a screen printing method. Thus, a ceramic green sheet on which a conductive paste film to serve as each of the internal electrodes 12 and 13 is obtained.

Next, a given number of the ceramic green sheets on which the conductive paste film has been formed as described above are laminated in a given order, and a given number of ceramic green sheets for external layers on which the conductive paste film is not formed are laminated above and below the laminate, thereby obtaining a green mother laminate. The green mother laminate is bonded by a pressure in the lamination direction by a measure, such as a hydrostatic pressure press, as required.

Next, the green mother laminate is cut into a given size, thereby cutting out a green ceramic element assembly 2.

Next, the green ceramic element assembly 2 is fired. The firing temperature depends on a ceramic material contained in the ceramic green sheet or a metal material contained in the conductive paste film, and is preferably selected from the range of about 900° C. to about 1300° C., for example.

Next, polishing treatment by barrel polishing or the like is carried out, and then the edges or the corners of the ceramic element assembly 2 are rounded, thereby forming the substantially rounded corners 16 on the boundaries of the end surfaces 7 and 8 and at least the principal surfaces 3 and 4. Simultaneously, figuring of the exposed portions 14 and 15 of the internal electrodes 12 and 13 are carried out. As required, water-repellent treatment is carried out for preventing penetration of a plating liquid from the gaps between the exposed portions 14 and 15 of the internal electrodes 12 and 13 and the ceramic layer 11.

Next, the ceramic element assembly 2 is subjected to plating by applying, for example, barrel plating to precipitate the first plating films 17 directly covering the exposed portions 14 and 15 of the first and second internal electrodes 12 and 13. As a plating method for forming the plating films 17, either an electrolytic plating method or an electroless plating method may be adopted, for example. In the case of the electroless plating method, when the metal contained in the internal electrodes 12 and 13 does not have catalytic activity, pretreatment by a Pd catalyst or other suitable material is preferably performed so as to increase a plating precipitation rate, resulting in a disadvantage in that the process is complicated. Therefore, it is preferable to adopt the electrolytic plating method.

When the plating films 17 are formed by the electrolytic plating method, Ni, Sn, Au, etc., in addition to Cu mentioned above, can be used as the metal constituting the plating films 17, for example. When the plating films 17 are formed by the electroless plating method, Cu electroless plating, Ni—P electroless plating, Ni—B electroless plating, or other suitable materials, can be applied, for example.

When the plating films 17 containing Cu are formed, it is preferable to carry out strike Cu plating before electrolytic Cu plating or electroless Cu plating so as to accelerate the formation of a Cu plating film. For the formation of the plating films 17, Cu plating is carried out and then, Ni plating and Sn plating may be further carried out, as required, as described above.

Thus, the laminated ceramic capacitor 1 is completed.

Figure 3:
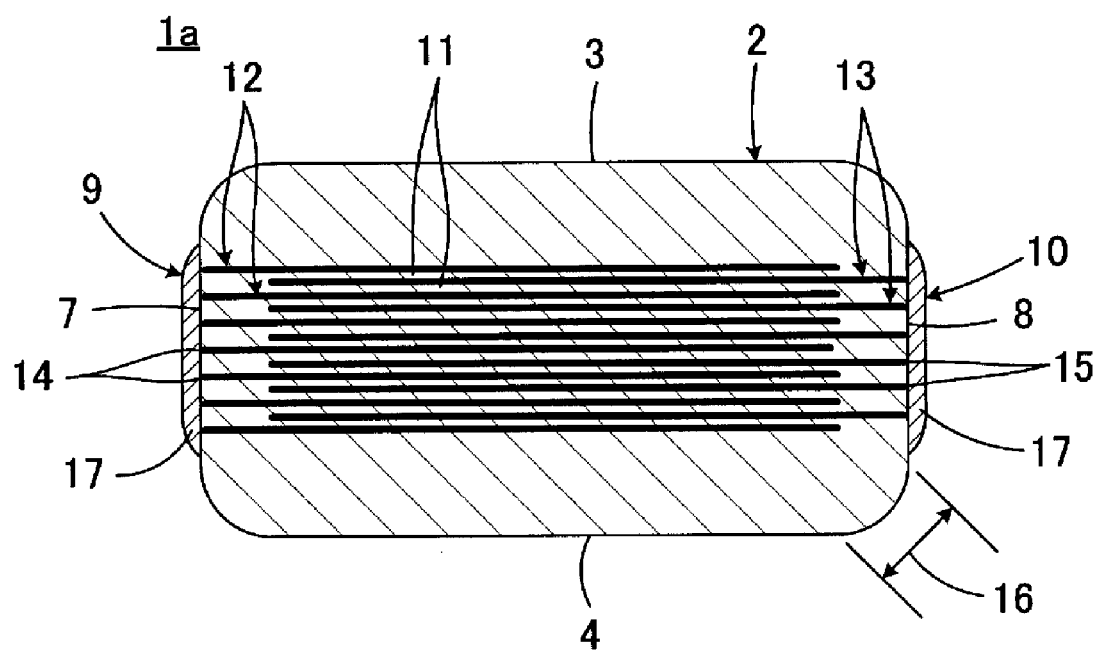
FIG. 3 is a view corresponding to FIG. 1 and illustrating a first comparative example to be referred to for describing advantages of the first preferred embodiment of the present invention.
Figure 4:
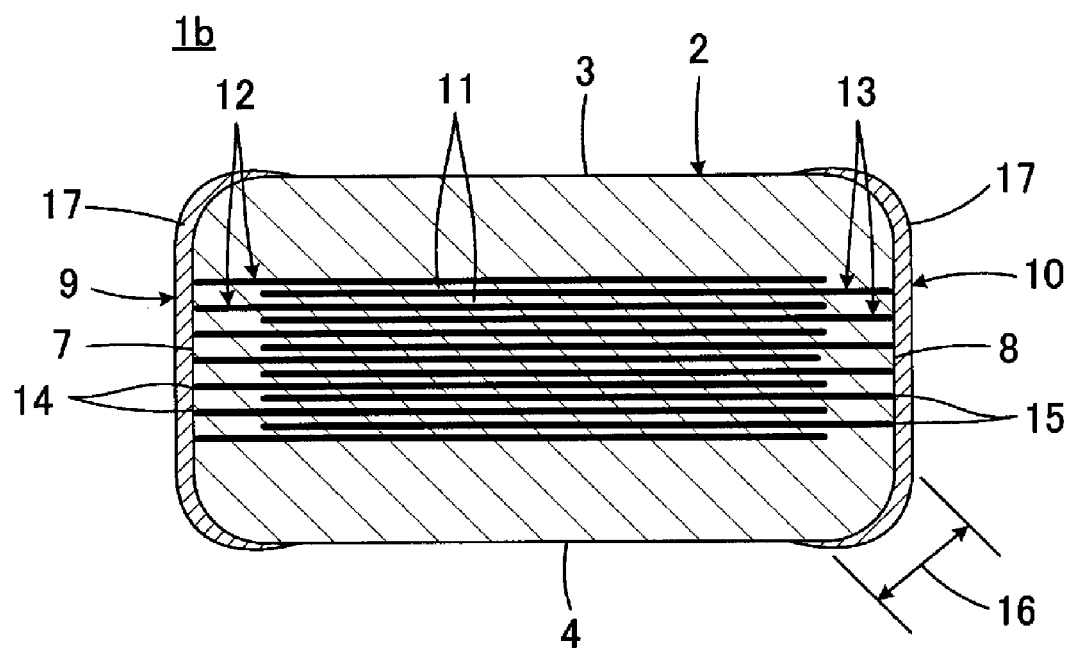
FIG. 4 is a view corresponding to FIG. 1 and illustrating a second comparative example to be referred to for describing advantages of the first preferred embodiment of the present invention.

FIGS. 3 and 4 are views corresponding FIG. 1 and each illustrate a comparative example to be referred to for describing advantages of the first preferred embodiment. In FIGS. 3 and 4, the components equivalent to the components illustrated in FIG. 1 are designated by the same reference numerals, and the duplicated descriptions are omitted.

In a laminated ceramic capacitor 1a illustrated in FIG. 3, the plating films 17 serving as the external terminal electrodes 9 and 10 are formed while being limited to the exposed portions 14 and 15 of the internal electrodes 12 and 13 and the vicinity thereof on the end surfaces 7 and 8. According to this comparative example, the distance from the ends of the plating films 17 to each of the exposed portions 14 and 15 of the internal electrodes 12 and 13 becomes relatively short. Thus, a penetration path of moisture or the like reaching the inside of the ceramic element assembly 2 from the outside through the internal electrodes 12 and 13 becomes short, and thus sufficient humidity resistance reliability cannot be obtained in some cases.

Next, in a laminated ceramic capacitor 1b illustrated in FIG. 4, the plating films 17 serving as the external terminal electrodes 9 and 10 are arranged so as to extend up to one portion of each of the principal surfaces 3 and 4 exceeding the corners 16 from the end surfaces 7 and 8. Therefore, the plating films 17 project from the principal surfaces 3 and 4, which hinders the reduction in the thickness of the laminated ceramic capacitor 1.

In view of the above, in the laminated ceramic capacitor 1 according to the first preferred embodiment illustrated in FIG. 1, the plating films 17 are arranged such that the ends thereof stop at the corners 16 and do not project from each of the principal surfaces 3 and 4 as described above. Thus, the problems of the laminated ceramic capacitors 1a and 1b according to the comparative examples described above can be solved.

Figure 5:
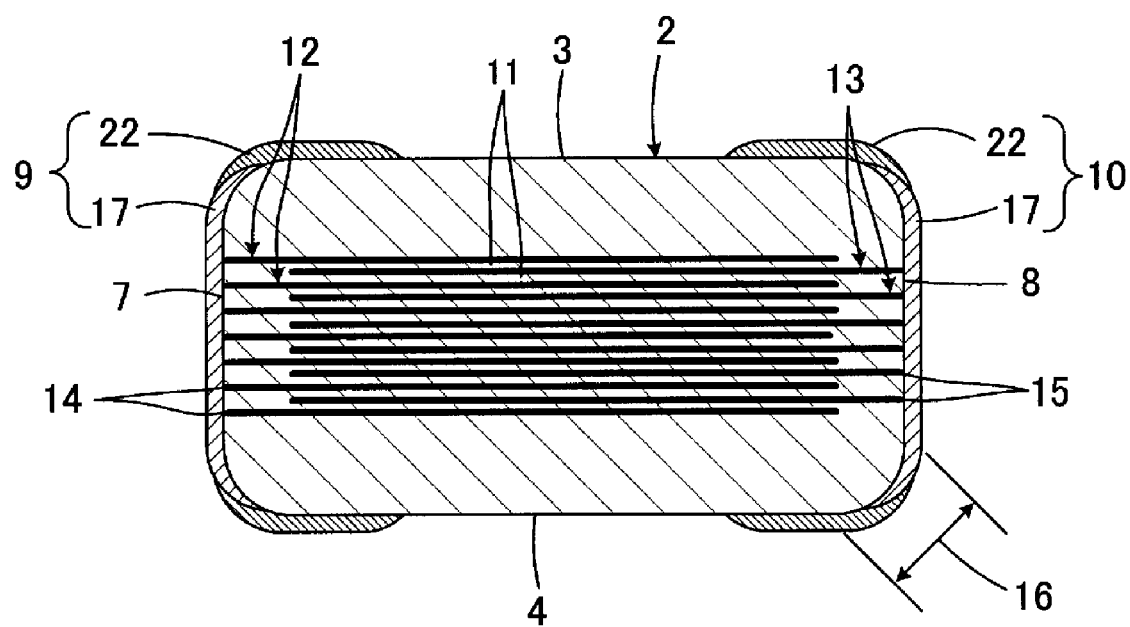
FIG. 5 is a cross-sectional view illustrating a laminated ceramic capacitor according to a second preferred embodiment of the present invention.

FIG. 5 is a cross sectional view illustrating a laminated ceramic capacitor 21 according to a second preferred embodiment of the invention. FIG. 5 corresponds to FIG. 1. In FIG. 5, the components equivalent to the components illustrated in FIG. 1 are designated by the same reference numerals, and the duplicated descriptions are omitted.

The laminated ceramic capacitor 21 illustrated in FIG. 5 has a feature of having a structure in which each of the external terminal electrodes 9 and 10 further has an auxiliary conductor film 22 in addition to the structure of the laminated ceramic capacitor 1 illustrated in FIG. 1. The auxiliary conductor film 22 is arranged so as to cover the ends of the plating films 17 at the corners 16 and extend to one portion of each of the principal surfaces 3 and 4. In this preferred embodiment, the auxiliary conductor films 22 are preferably arranged so as to extend up to one portion of each of the side surfaces 5 and 6 (FIG. 2), which is not essential in the present invention.

The auxiliary conductor films 22 are preferably formed by applying conductive pastes to given areas, and then firing the same. As the conductive paste, a conductive paste containing Cu powder and glass frit, for example, is used. Therefore, the auxiliary conductor films 22 contain glass components, and the glass components partially permeate in the interfaces of the plating films 17 and the ceramic element assembly 2. This contributes to improvement in humidity resistance reliability.

Figure 6:
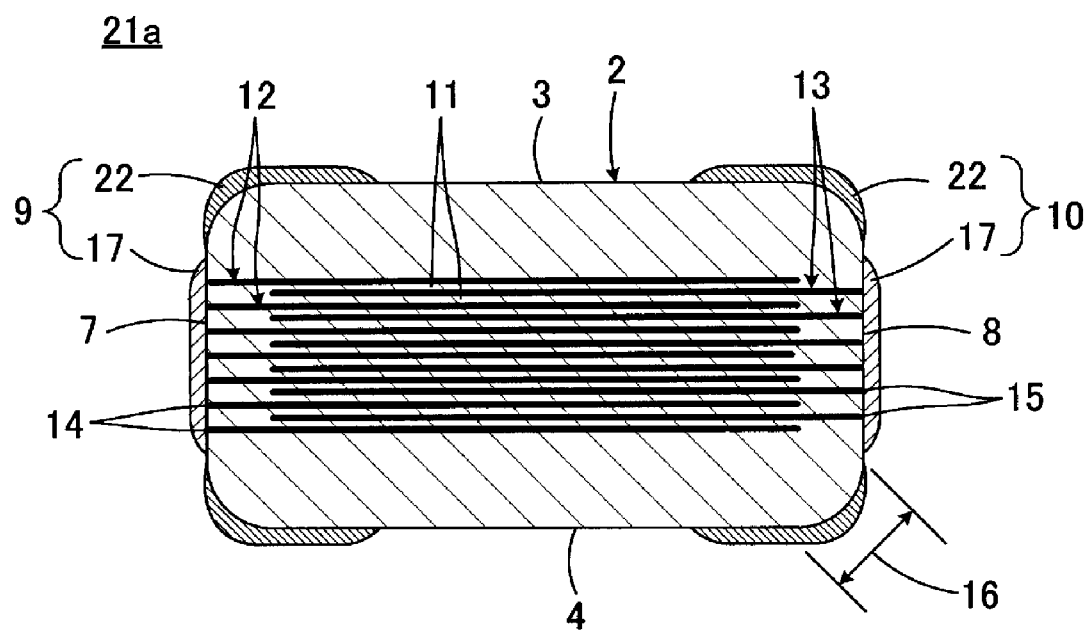
FIG. 6 is a view corresponding to FIG. 5 and illustrating a first comparative example to be referred to for describing advantages of the second preferred embodiment of the present invention.
Figure 7:
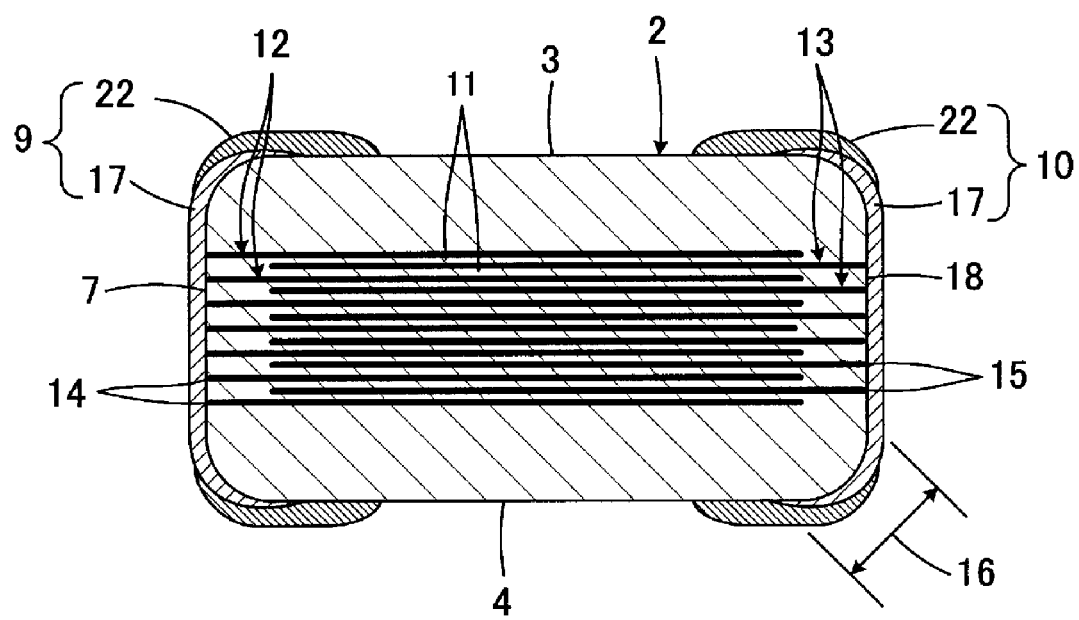
FIG. 7 is a view corresponding to FIG. 5 and illustrating a second comparative example to be referred to for describing advantages of the second preferred embodiment of the present invention.

FIGS. 6 and 7 illustrate views corresponding to FIG. 5 and each illustrates a comparative example to be referred to for describing advantages of the second preferred embodiment.

The laminated ceramic capacitor 21a illustrated in FIG. 6 has a feature of having a structure in which each of the external terminal electrodes 9 and 10 further has an auxiliary conductor film 22 in addition to the structure of the laminated ceramic capacitor 1a illustrated in FIG. 3. In the laminated ceramic capacitor 21a, the auxiliary conductor films 22 do not reach the ends of the plating films 17. Therefore, the glass components contained in the auxiliary conductor films 22 are can permeate into the interfaces of the plating films 17 and the ceramic element assembly 2. As a result, the interfaces cannot be sealed off from such glass components, and thus humidity resistance reliability deteriorates.

The laminated ceramic capacitor 21b illustrated in FIG. 7 has a feature of having a structure in which each of the external terminal electrodes 9 and 10 further has an auxiliary conductor film 22 in addition to the structure of the laminated ceramic capacitor 1b illustrated in FIG. 4. In the laminated ceramic capacitor 21b illustrated in FIG. 7, the thickness of each of the external terminal electrodes 9 and 10 on the ends of the principal surfaces 3 and 4 includes not only the thickness of the auxiliary conductor films 22 but the thickness of the plating films 17, and thus becomes larger than that of the laminated ceramic capacitors 21 and 21a illustrated in FIGS. 5 and 6. Therefore, the reduction in the thickness of the laminated ceramic capacitor 21b is hindered.

Figure 8:
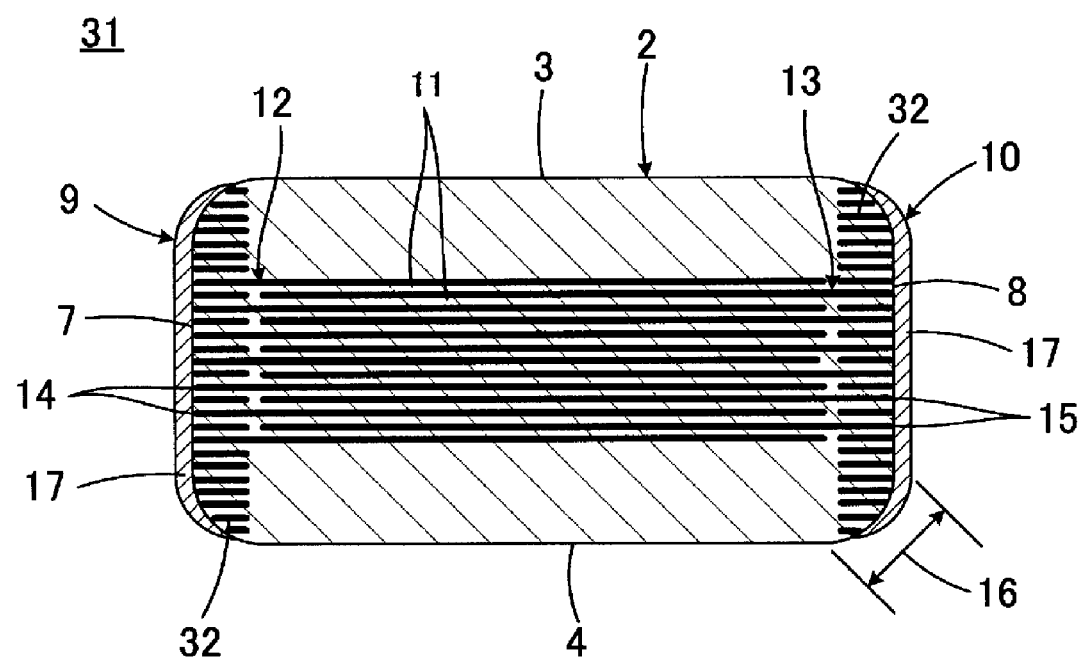
FIG. 8 is a cross-sectional view illustrating a laminated ceramic capacitor according to a third preferred embodiment of the present invention.

FIG. 8 is a view illustrating a laminated ceramic capacitor 31 according to a third preferred embodiment of the invention and corresponding FIG. 1.

In FIG. 8, the components equivalent to the components illustrated in FIG. 1 are designated by the same reference numerals, and the duplicated descriptions are omitted.

The laminated ceramic capacitor 31 illustrated in FIG. 8 has a feature in that dummy internal conductors 32 are formed as internal conductors in addition to the internal electrodes 12 and 13 described above in the ceramic element assembly 2. The dummy internal conductors 32 do not substantially contribute to the development of electrical properties.

The dummy internal conductors 32 have exposed portions at the end surfaces 7 and 8 of the ceramic element assembly 2 similarly as in the case of the internal electrodes 12 and 13, and these exposed portions are also directly covered with the plating films 17. The dummy internal conductors 32 can be formed by substantially the same method as in the internal electrodes 12 and 13, and metals contained therein are preferably the same as the metals contained in the internal electrodes 12 and 13.

By the formation of the dummy internal conductors 32 described above, the fixing force, which is given by the plating films 17, of the external terminal electrodes 9 and 10 to the ceramic element assembly 2 can increase. Moreover, by selecting the position of the dummy internal conductors 32, the precipitation areas of the plating film 17 can be easily controlled.

As a modification of the third preferred embodiment illustrated in FIG. 8, the auxiliary conductor films 22 as illustrated in FIG. 5 may be formed on the external terminal electrodes 9 and 10.

As described above, preferred embodiments of the present invention are described with reference to a laminated ceramic capacitor, and can also be applied to laminated ceramic electronic components having functions, such as inductors, thermistors, or piezoelectric elements. Therefore, the ceramic layer constituting the ceramic element assembly is not limited to a ceramic layer constituted by a dielectric ceramic and may be constituted by a piezoelectric ceramic, a semiconductor ceramic, a magnetic ceramic, etc.

From a structural aspect, the laminated ceramic electronic components to which preferred embodiments of the present invention are applied may be a multiple terminal electronic component, such as a capacitor array or the like. In the case of a multiple terminal electronic component, for example, a plurality of external terminal electrodes extending from one principal surface to the other principal surface are preferably arranged in a strip manner on each end surface of a ceramic element assembly. In this case, even when substantially rounded corners are provided on the boundaries between the end surfaces and the side surfaces of the ceramic element assembly, the ends of plating films serving as the external terminal electrodes are not formed such that the ends thereof do not reach the corners in many cases. Therefore, when the multiple terminal electronic components described above are taken into consideration as a preferred embodiment in the present invention, it is understood that it is not essential to form the substantially rounded corners on the boundaries between the end surfaces and the side surfaces of the ceramic element assembly, so that the ends of the plating films stop at the corners.

Next, an experimental example carried out for confirming the effects obtained by various preferred embodiments of the present invention will be described. In this experimental example, the laminated ceramic capacitor according to the second preferred embodiment illustrated in FIG. 5 (hereinafter referred to as "Working Example"), the laminated ceramic capacitor according to the comparative example illustrated in FIG. 6 (hereinafter referred to as "Comparative Example 1"), and the laminated ceramic capacitor according to the comparative example illustrated in FIG. 7 (hereinafter referred to as "Comparative Example 2") were separately produced, and then were evaluated.

First, the ceramic element assembly for the laminated ceramic capacitor having a specification as illustrated in Table 1 was prepared.

TABLE 1

| | |
|---|---|
| Dimension | Length: 1.0 mm, Width: 0.5 mm, Height: 0.5 mm |
| Ceramic layer material | Barium titanate dielectric ceramic |
| Metal type of internal electrode | Nickel as a main component |
| Lamination number | 220 |
| Ceramic layer thickness | 1.5 μm |
| Rated voltage | 6.3 V |
| Electrostatic capacity | 2.2 μF |

Next, the ceramic element assembly was subjected to barrel polishing to round the edges or the corners of the ceramic element assembly, thereby forming substantially rounded corners on the boundaries of the end surfaces and at least the principal surfaces and, simultaneously, carrying out shaping of the exposed portions of the internal electrodes.

Next, in order to form plating films serving as external terminal electrodes at the end surfaces of the ceramic element assembly, Cu strike plating and thick Cu plating were carried out using a plating bath indicated in Table 2 by applying a horizontal rotating barrel under plating conditions indicated in Table 3, thereby forming a Cu plating film having a thickness of about 10 μm.

As is understood from Table 3, the Cu strike plating was carried out while changing the plating time as follows: 200 minutes in Working Example, 50 minutes in Comparative Example 1, and 200 minutes in Comparative Example 2, so that the precipitation areas of the plating films 17 as illustrated in each of FIGS. 5 to 7 were obtained. Subsequently, the thick Cu plating was carried out while changing the plating time as follows: 200 minutes in Working Example, 250 minutes in Comparative Example 1, and 100 minutes in Comparative Example 2, so that the total thickness of the thickness of the plating films by the Cu strike plating and the total thickness of the thickness of the plating films by the thick Cu plating are controlled to be equivalent to each other.

TABLE 2

Cu strike plating 14 g/l of copper pyrophosphate
120 g/l of pyrophosphoric acid
10 g/l of potassium oxalate
Bath temperature: 25° C.
pH: 8.7

TABLE 2-continued

Thick Cu plating

"Pyrobright process" manufactured by C Uyemura & Co., Ltd.
Bath temperature: 55° C.
pH: 8.6

Ni plating

Watt bath (weakly acidic simple nickel bath)
Bath temperature: 60° C.
pH: 4.2

Sn plating

"Sn-235" manufactured by Dipsole Co.
Bath temperature: 33° C.
pH: 5.0

TABLE 3

| | |
|---|---|
| Number of rotations of horizontal rotating barrel | 10 rpm |
| Conductive media | 1.8 mmφ |

| | Current density × Time |
|---|---|
| Cu strike plating | |
| Working Example | 0.11 A/dm$^2$ × 100 minutes |
| Comparative Example 1 | 0.11 A/dm$^2$ × 50 minutes |
| Comparative Example 2 | 0.11 A/dm$^2$ × 200 minutes |
| Thick Cu plating | |
| Working Example | 0.30 A/dm$^2$ × 200 minutes |
| Comparative Example 1 | 0.30 A/dm$^2$ × 250 minutes |
| Comparative Example 2 | 0.30 A/dm$^2$ × 100 minutes |
| Ni plating | 0.20 A/dm$^2$ × 60 minutes |
| Sn plating | 0.10 A/dm$^2$ × 60 minutes |

Next, Cu powder and glass frit containing ZnO—$B_2O_3$—$SiO_2$ glass as a main component were mixed, and a suitable amount of organic vehicles were added. The obtained mixture was mixed by three rolls for dispersion, thereby obtaining a conductive paste.

Next, in order to form the auxiliary conductor films 22 as illustrated in FIGS. 5 to 7, the conductive paste was applied to one portion of each of the principal surfaces and the side surfaces of the ceramic element assembly, and then the resultant was fired at the maximum temperature of 800° C. in a nitrogen atmosphere for 2 hours.

Then, Ni plating and Sn plating were successively carried out using the plating bath indicated in Table 2 by applying a horizontal rotating barrel under plating conditions indicated in Table 3 to form an Ni plating film having a thickness of about 4 μm on the Cu plating film and the auxiliary conductor film and from an Sn plating film having a thickness of about 4 μm thereon, thereby obtaining samples of Comparative Examples 1 and 2.

Next, each sample thus obtained was first measured for the thickness of the external terminal electrodes on the principal surfaces of the ceramic element assembly. In more detail, the laminated ceramic capacitor of each sample was subjected to cross-section polishing until the dimension in the width direction became half. Then, the thickness of the external terminal electrodes on the principal surfaces of the ceramic element assembly was measured using an optical microscope. The thickness of ten samples was measured, and then the average values thereof were measured. Thus, in Working Example and Comparative Examples, the average values thereof were as small as 8.5 μm and 8.3 μm, respectively, but, in contrast, in Comparative Example 2, the average value was as relatively large as 13.1 μm.

Moreover, a humidity resistance reliability test was carried out. Under an environment of 125° C./95% RH, a 6.3 V voltage (rated voltage) was applied to each sample for 72 hours. Then, samples in which the insulation resistance became 1 MΩ or lower was judged to be defective and the number of defective samples among 20 samples of each sample type was measured. As a result, the number of defective samples was 0 in Working Example and Comparative Example 2, and defective samples were not produced, but, in contrast, in Comparative Example 1, four defective samples were produced among the 20 samples.

While preferred embodiments of the present invention have been described above, it is to be understood that variations and modifications will be apparent to those skilled in the art without departing the scope and spirit of the present invention. The scope of the invention, therefore, is to be determined solely by the following claims.

What is claimed is:

1. A laminated ceramic electronic component, comprising:
    a ceramic element assembly including a laminate of a plurality of ceramic layers laminated in a lamination direction, a pair of principal surfaces facing each other, a pair of side surfaces facing each other, and a pair of end surfaces facing each other;
    internal conductors disposed in the ceramic element assembly and having exposed portions on each end surface of the ceramic element assembly;
    external terminal electrodes each having a plating film directly covering the exposed portions of the internal conductors on the end surfaces of the ceramic element assembly; and
    substantially rounded corners located on boundaries between the end surfaces and the principal surfaces of the ceramic element assembly; wherein
    the plating films are arranged such that portions of the plating films extend onto the substantially rounded corners and ends of the plating films are disposed on the substantially rounded corners, are tapered as they approach the pair of principal surfaces, and do not project from either of the pair of principal surfaces in the lamination direction;
    the external terminal electrodes include auxiliary conductor films arranged to cover the portions of the plating films extending onto the substantially rounded corners and the ends of the plating films disposed on the substantially rounded corners and to extend onto a portion of at least one the pair of principal surfaces.

2. The laminated ceramic electronic component according to claim 1, wherein the auxiliary conductor film includes a glass component and the glass component partially penetrates into the interfaces of the plating films and the ceramic element assembly.

3. The laminated ceramic electronic component according to claim 1, wherein the internal conductors include dummy internal conductors that do not substantially contribute to the development electrical properties.

* * * * *